US005325595A

United States Patent [19]

Marlin

[11] Patent Number: 5,325,595

[45] Date of Patent: Jul. 5, 1994

[54] WALLPAPER OUTSIDE CORNER TRIMMER GUIDE

[76] Inventor: Charles W. Marlin, 3035 Westwood Dr., Grand Island, N.Y. 14072

[21] Appl. No.: 989,148

[22] Filed: Dec. 11, 1992

[51] Int. Cl.$^5$ .................... G01B 1/00

[52] U.S. Cl. .................... 30/294; 33/526; 33/533

[58] Field of Search .................... 30/294, 329, 169, 282, 30/286; 7/105, 163, 164; 33/645, 646, 648, 526, 533

[56] References Cited

U.S. PATENT DOCUMENTS

| | | | |
|---|---|---|---|
| 1,412,728 | 4/1922 | Werner | 30/169 |
| 2,526,867 | 10/1950 | Hitchcock | 30/162 |
| 3,106,020 | 10/1963 | Tape | 30/32 |
| 3,862,494 | 1/1975 | Andersson | 30/294 |
| 3,862,495 | 1/1975 | Markert | 30/294 |
| 4,531,302 | 7/1985 | Tighe | 33/483 |
| 4,667,409 | 5/1987 | D'Amato | 30/294 |

*Primary Examiner*—Richard K. Seidel
*Assistant Examiner*—Hwei-Siu Payer
*Attorney, Agent, or Firm*—Wallace F. Neyerlin

[57] ABSTRACT

A trimmer guide for hanging wallpaper along the outside corner (typically of a passageway). The guide is rectangular shaped, about 6 inches long and about 1 and ¼ inches wide with a blade portion about ¾ inches wide and about 0.23 inches thick. The guide also has a gripping portion about ½ inch wide and a thickness between about 0.046 inches and about 0.120 inches, the difference in thickness between the gripping portion and the blade portion resulting in at least one straight ledge along the entire length of the guide.

7 Claims, 3 Drawing Sheets

WALLPAPER OUTSIDE CORNER TRIMMER GUIDE

BACKGROUND OF THE INVENTION

1. Field of the Invention

The following invention relates to a unique trimmer guide particularly useful to make it easier to trim wallpaper along the outside corner (typically of a passageway) where the inside of the passageway is some other material like paint or other paper.

2. Description of Related Art

A novelty search was conducted in the U.S. Patent office.

The search was made in the following art:

Class 7, sub-classes 105, 163, and 164;

Class 30, sub-classes 282, 286, 289, 290 and 291; and

Class 156, sub-class 576.

U.S. Pat. No. 4,667,409, issued to P. D'Amato on May 26, 1987 is the closest and only reference that was found. This "Wallpaper Trimmer" is out of Class 30 ("Cutlery"); it includes built-in cutting blades 26 and 28, and is quite different than the trimmer guide of the present invention.

The tool of this reference may work well but besides being structurally different than the structure of the present invention, it is believed that the changing of the blades 24 and 22 used in the trimmer would be time consuming; and also that the blades would have to be changed fairly often; also that the price of the blades shown in the trimmer would be more costly than the regular "break off" blades used in conjunction with the trimmer guide of the present invention. Also, the adjustment of the blades used in the trimmer of the D'Amato reference to get as close as possible to the corner is done with shims. This is cumbersome and more time is involved in trimming the wallpaper as compared to using the regular break off blades in conjunction with the trimmer guide of the present invention.

SUMMARY OF THE INVENTION

In hanging wallpaper along the outside corner of a passageway utilizing the trimmer guide of this invention, the paperer first wraps the wet paper around the corner and onto the inside of the passageway a couple of inches and "sticking" it there temporarily. (This temporary hanging of this small amount of new paper does not adversely affect the appearance of the wall on the inside of the passageway because the sizing or paste on the inside surface of the wet new paper can be easily washed away with a wet sponge or cloth). Then the paperer places the flat surface of the trimmer guide on top of the paper on the inside of the passageway with the trim guide's raised edge at the corner. The paper is then cut or trimmed along the corner surface typically with a regular "break off" blade razor along the guide edge for a distance slightly shorter than the length of the guide. Then the paperer moves the guide further across the top and down the sides and proceeds as above until complete.

Broader aspects of the invention and devices within the scope of same will become clearer from a further reading of the specification and claims and a consideration of the drawings.

BRIEF DESCRIPTION OF THE DRAWINGS

FIG. 5 also being a cross-sectional view of the guide of FIG. 1, taken across the line 5—5 of same;

DETAILED DESCRIPTION OF THE DRAWINGS AND OF THE PREFERRED EMBODIMENTS

Figure 1:
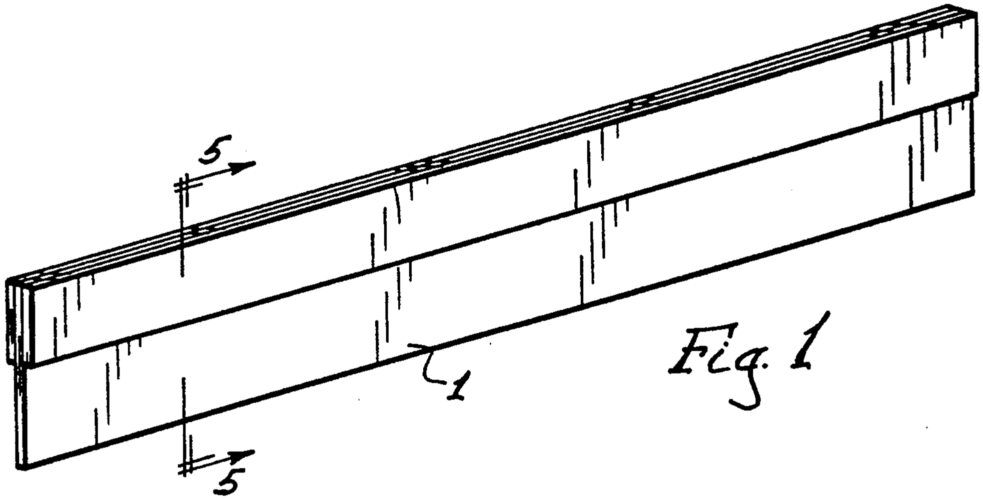
FIG. 1 is a perspective view of a trimmer guide of the present invention.
Figure 2:
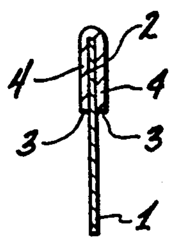
FIGS. 2-5 are end views of various alternative trimmer guide constructions embraced within the teachings and scope of the invention.
Figure 3:
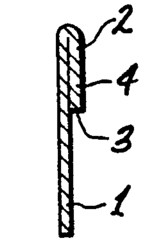

In all of the drawings the numeral 1 depicts the blade portion of the trimmer guide. It is this portion of the guide, i.e. its flat surface, that is placed on top of the paper to be cut on the inside of the arch. Numeral 2 depicts the raised portion of the guide which is gripped and held by the paperer as he trims along the corner surface of the passageway, the locating edge or lip 3 (or 3' or 3") of said raised portion being pressed the entire length of the guide against the passageway corner's edge. The paperer will also typically press against the surface of the blade as he trims the paper. Numeral 4 depicts the grasping surface of the raised or gripping portion of the guide. Preferred dimensions of the trimmer guide are illustrated in connection with FIGS. 1, 3 and 4.

As can be seen, the trimmer guide is preferably about 6 inches long, about 1¼ inches wide, the grasping portion of the guide being between about 0.046 and about 0.120 inches thick, and about ½ inch wide, the blade being about 0.023 inches thick and about ¾ inches wide and the "locating edge" 3 of the guide having a thickness of between about 0.023 and about 0.056 inches.

Figure 4:
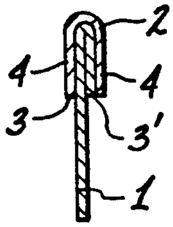
Figure 5:
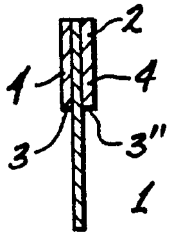

It should be noted from a study of FIGS. 2-5 that sometimes the guide may be so constructed as to have only one locating edge or lip 3 (e.g. FIG. 3) but that typically and preferably it will have two such locating edges 3 and that these may have identical thicknesses (e.g. FIG. 2) or varying thicknesses (e.g. FIGS. 4 and 5). The structures of FIGS. 4 and 5 are preferred embodiments in that they each possess lips 3' (FIG. 4) or 3" (FIG. 5) with different dimensions on each side of the blade 1. A lip with a thickness of about 0.041 inches is preferred for use on near perfect corners whereas a lip of about 0.056 inches is preferred for use on not so perfect corners. In FIGS. 4 and 5, which illustrate slightly different guide constructions at the gripping portions, lip 3 of each will preferably be about 0.041 inches thick; and lip 3' of FIG. 4 and lip 3" of FIG. 5 will preferably be about 0.056 inches thick.

The $\frac{3}{4}$ inch width of the blade is not absolutely critical but is near the ideal since deviating to any great extent from this width by making it greater or less takes away from the paperer's stability of holding the trimmer guide on the corner as he proceeds with cutting the paper at the corner's edge.

The guide's length of six inches is also not absolutely critical but is near the ideal since a shorter length would require more cutting moves by the user and a longer length may result in the user having trouble if the corner is convex or concave in some spots. It is therefore preferred that the guide not be any shorter than about 5 inches and not be any longer than about 7 inches.

Referring now in more detail to FIGS. 6–9, number 11 depicts a passageway, number 13 the wall to be papered and number 14 the ceiling of the room or hallway adjacent to the passageway being papered.

Figure 6:
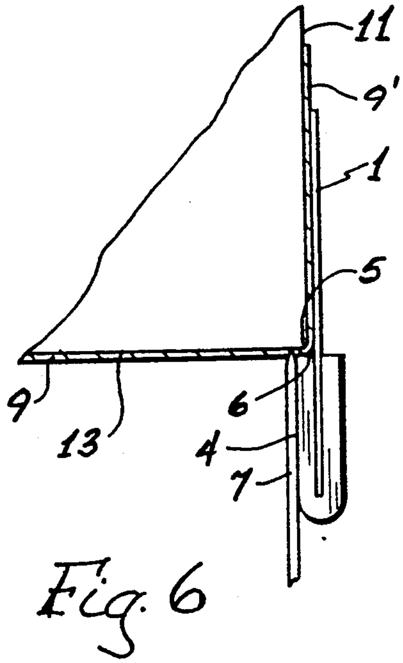
FIG. 6 is a section view of the wall corner, trimmer guide and razor knife positioned to trim the paper, one of the walls temporarily covered with paper for a distance of a couple of inches as aforedescribed.
Figure 9:
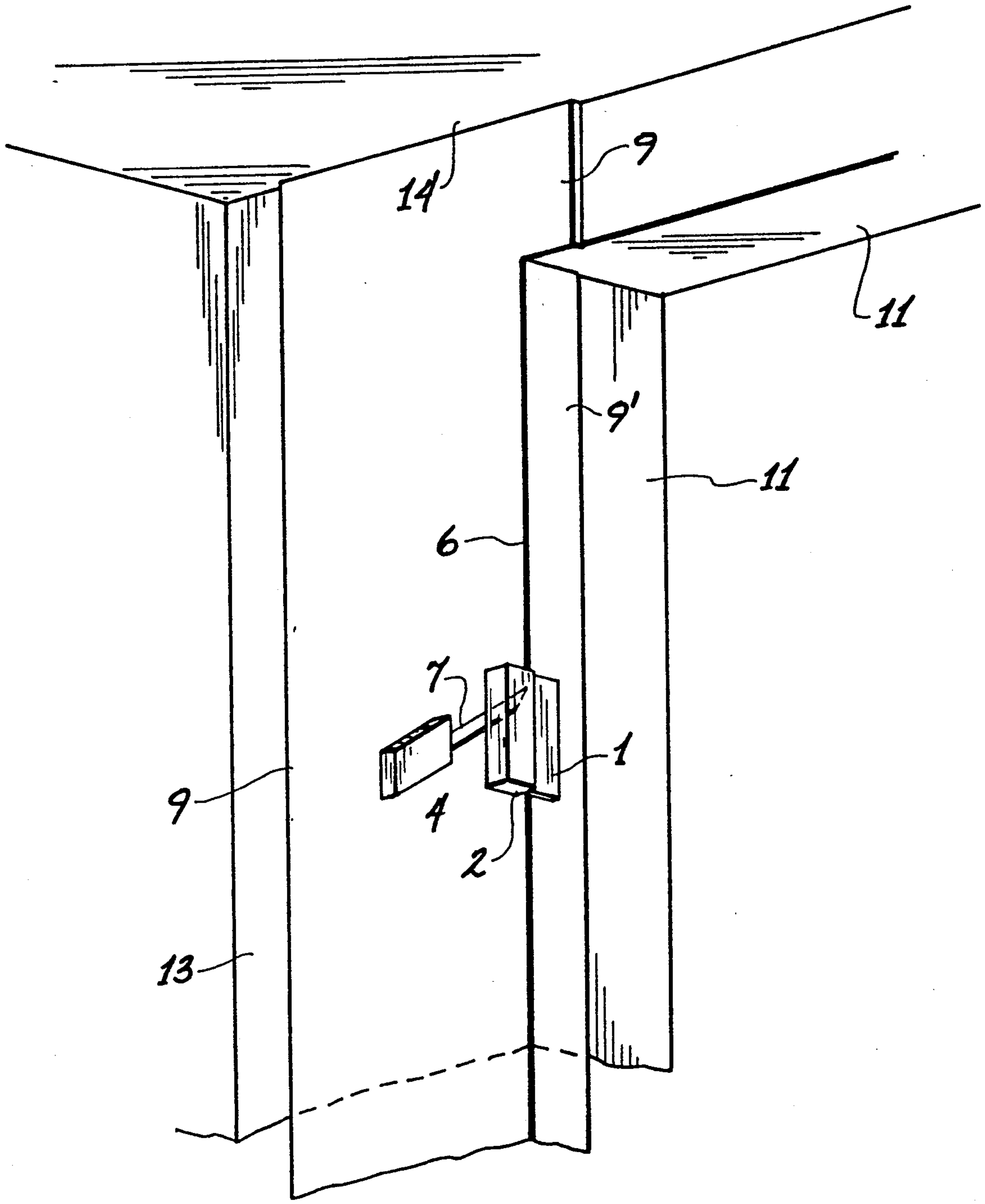
FIG. 9 is also a perspective view looking up at the entryway and ceiling but also illustrating the paper trimming operation at one of the entryway corners.

In FIG. 6, paper 9 is being applied to wall 13 and is wrapped around corner radius 5 a short distance, such as about 2 inches, and hung temporarily, being then designated as 9', the paper to be trimmed off. (This operation is also depicted in FIG. 9.) Blade 1 of the paper trimming guide is then pressed firmly against 9' and the paperer then separates the paper 9' from 9 by scribing razor knife 7 along surface 4 of the trimming guide, keeping blade 1 pressed firmly against 9' as he does so. Number 6 depicts the corner radius due to the paper being applied to the wall, leaving a very thin recess or margin 8 of wall 13 not being covered by paper 9, as shown in FIG. 7.

Figure 7:
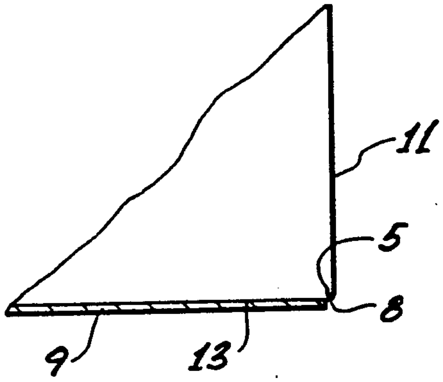
FIG. 7 is a section view at the same wall corner, after the newly applied paper is trimmed and the temporarily applied paper is removed.
Figure 8:
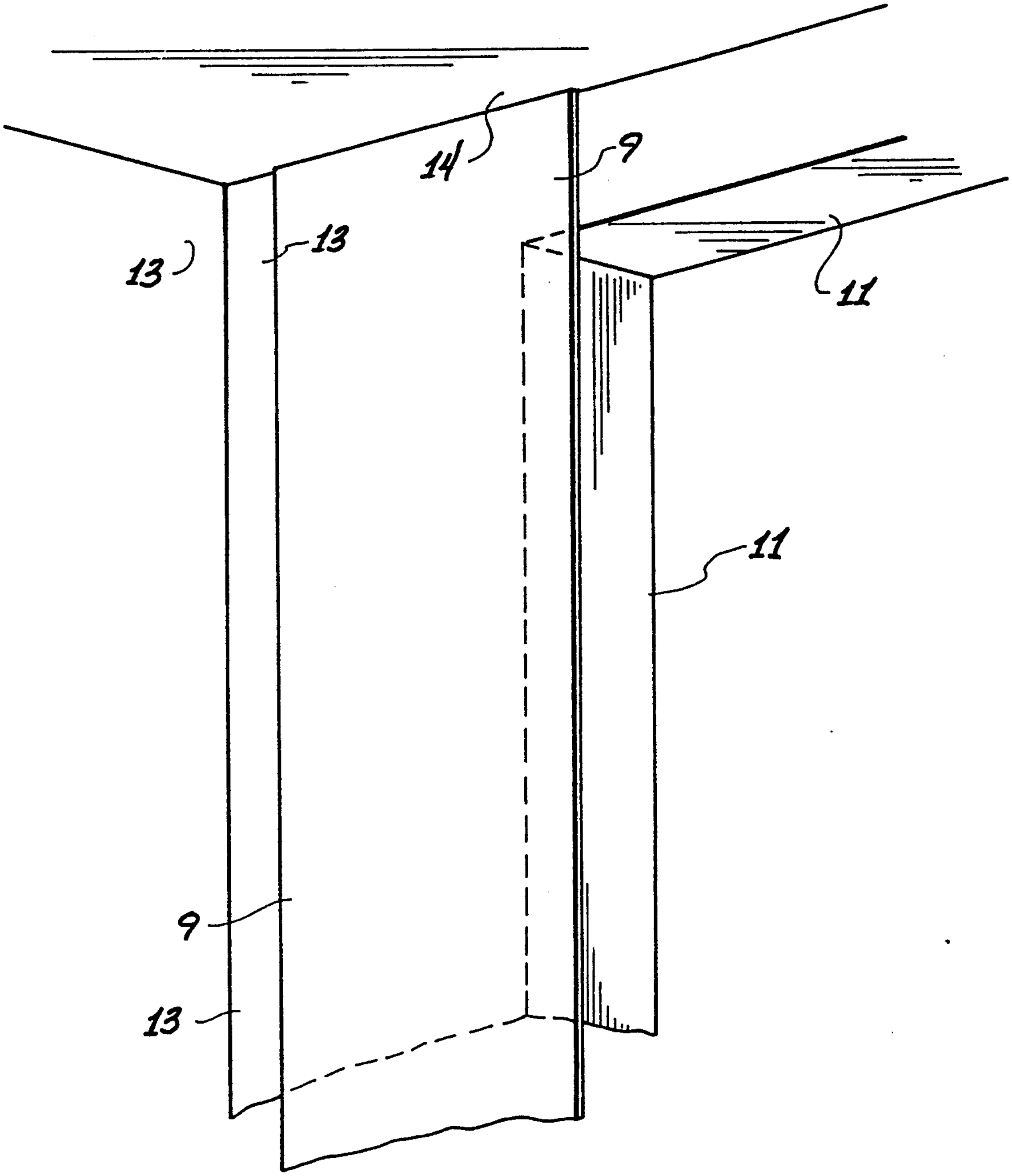
FIG. 8 is a perspective view looking up at the passageway and ceiling with the paper temporarily extending beyond a vertical a corner of the entryway or passageway a distance of a couple of inches and ready for trimming.

What FIGS. 7–9 show has previously been described except for what the above numerals depict or stand for.

The guide of this invention is preferably constructed of steel and offers a superior way of trimming around passageways. It is much easier and more accurate than trimming free-hand. Also, when trimming some papers, the vinyl will trim clean but the backing will bunch and tear. The guide tool of this invention stops this because the guide is holding the paper tight to the corner.

It will be appreciated that the foregoing specification and the accompanying drawings are set forth by way of illustration and not limitation, and that various modifications and changes may be made therein without departing from the spirit and scope of the present invention which is to be limited solely by the scope of the appended claims.

I claim:

1. A rectangular shaped wallpaper outside corner trimmer guide, said guide being about six inches long and about 1 and $\frac{1}{4}$ inches wide, said guide having a gripping portion about $\frac{1}{2}$ inch wide and a blade portion about $\frac{3}{4}$ inch wide, said blade portion being about 0.023 inches thick and said gripping portion having a thickness in the range of 0.046 inches to about 0.120 inches, the difference in thickness between the gripping portion and the blade portion resulting in at least one straight ledge along the entire length of the guide, the thickness of said ledge in the range of 0.023 to 0.056 inches.

2. A wallpaper trimmer guide according to claim 1 wherein the thickness of the gripping portion of the guide is about 0.046 inches, wherein the guide is of one-piece construction originally about $1\frac{3}{4}$ inches wide and wherein the guide is formed by the gripping portion being bent back against itself a distance of about $\frac{1}{2}$ inch.

3. A wallpaper trimmer guide according to claim 1 wherein the guide is of two-piece construction with the gripping portion of the guide being bent around one edge of the blade portion a distance of about $\frac{1}{2}$ inch along the entire length of the blade portion resulting in straight ledges of equal thickness on each side of the blade portion along the entire length of the guide.

4. A wallpaper trimmer guide according to claim 1 wherein the difference in thickness between the gripping portion and the blade portion results in straight ledges on each side of the blade portion along the entire length of the guide.

5. A wallpaper trimmer guide according to claim 4 wherein the ledges on each side of the blade portion are of equal thickness.

6. A wallpaper trimmer guide according to claim 4 wherein the ledges on each side of the blade portion are of unequal thickness.

7. A wallpaper trimmer guide according to claim 6 wherein the ledge on one side of the blade portion is about 0.041 inches thick and the ledge on the other side of the blade portion is about 0.056 inches thick.

* * * * *